United States Patent [19]

Kervennal et al.

[11] 4,426,515
[45] Jan. 17, 1984

[54] PROCESS FOR THE MANUFACTURE OF POLYURETHANES BY CARBONYLATION OF NITRATED HYDROXY-AROMATIC COMPOUNDS

[75] Inventors: Jacques Kervennal, Lyons; Jean-Marie Cognion, Saint Genis Laval, both of France

[73] Assignee: Produits Chimiques Ugine Kuhlmann, Courbevoie, France

[21] Appl. No.: 487,260

[22] Filed: Apr. 21, 1983

[30] Foreign Application Priority Data

May 14, 1982 [FR] France ............................. 82 08410

[51] Int. Cl.³ ........................................... C08G 71/04
[52] U.S. Cl. ..................................... 528/210; 528/86
[58] Field of Search .............................. 528/86, 210

[56] References Cited

PUBLICATIONS

Berichte, 43, 3133 (1909).
Kinstle et al., J.P.S., Polymer Lett. ed., 15, 467 (1977).

Primary Examiner—Lester L. Lee
Attorney, Agent, or Firm—Sigalos & Levine

[57] ABSTRACT

A process for the manufacture of polyurethanes by direct reaction in the liquid phase, comprising reacting, in the presence of a catalyst, carbon monoxide with a nitrated hydroxy-aromatic derivative of the formula:

HO—Ar—NO$_2$ 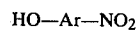

wherein Ar represents the aromatic radical:

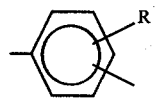

with the nitro and hydroxyl functional groups being in the para or meta positions with respect to each other, and R representing hydrogen or halogen atoms, or an alkyl group containing from 1 to 10 carbon atoms.

9 Claims, No Drawings

PROCESS FOR THE MANUFACTURE OF POLYURETHANES BY CARBONYLATION OF NITRATED HYDROXY-AROMATIC COMPOUNDS

BACKGROUND OF THE INVENTION

The polyurethanes are polymers usually prepared by the condensation reaction of diisocyanates or polyisocyanates with polyols. Their area of application is extremely vast because of the fact of structural and textural differences which it is possible to obtain, permitting a large range of products ranging from flexible foams to rigid elastomers. The standard synthesis of isocyanates starting from hydrocarbon structures, cells upon three reaction stages, namely, nitration, hydrogenation and phosgenation.

This necessitates having at one's disposal different equipment for each stage, purifying generally by distillation the diamine and then the diisocyanate, synthesizing and manipulating the phosgene, a dangerous product, which furthermore involves the co-production of hydrochloric acid which must either be used in other reactions or be electrolyzed in order to recover the chlorine and the hydrogen. Hence, there is also the costly upkeep of an electrolysis shop.

SUMMARY OF THE INVENTION

The present invention makes it possible to prepare a polyurethane structure in a new manner and in one stage, by using solely carbon monoxide and mononitrated aromatic molecules, having been substituted by a hydroxyl functional group in the para or meta position. Operation takes place in the hot state, in the liquid phase under pressure, in the presence of a catalytic system.

The invention comprises a process for the manufacture of polyurethanes by reaction, in the liquid phase, of nitrated para or meta hydroxy-aromatic compound with carbon monoxide in the presence of a catalyst based on a precious metal of Group VIII of the Periodic Table and, optionally, a second transition metal selected from Group $V_b$, $VI_b$, or VIII of the Periodic Table.

Heteroaromatic bases, such as pyridine for instance, are preferably used in the reaction since they act favorably on the kinetics of the reaction by improving the activity and selectivity of the catalyst.

DETAILED DESCRIPTION

Under the conditions of the instant invention, the reaction of carbon monoxide with the para or meta hydroxynitroaromatic compound can be written as follows:

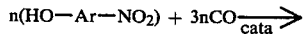

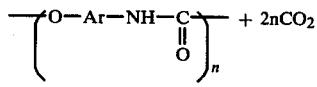

A type of polyurethane responding to this formula has been synthesized, according to the literature, based on different methods; we are dealing with poly(1,4 oxycarbonylimino phenylene):

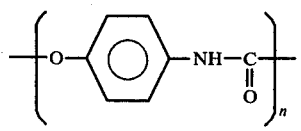

This polymer was prepared for the first time by STOERMER in 1909, according to the description made in Ber. (Berichte), 43, 3133 (1909), by the thermal decomposition of the parahydroxy benzoyl azide:

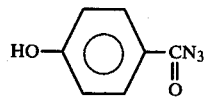

In Ann. Chim. 43, 679 (1953), ILLARI et al. have published another synthesis of the same polymer by the thermal decomposition of N-parahydroxy phenyl N'-phenylurea:

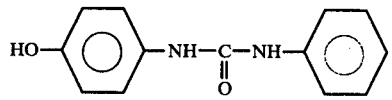

More recently, J. F. KINSTLE and L. E. SEPULVEDA, in J. Polymer Sci. Polymer Lett. ed. 15, 467, (1977) revealed the original sublimation properties of this polymer and Japanese Patent No. 56.103222 describes a synthesis of it by heating parahydroxy-carbamate prepared by reaction of the para-aminophenol with a chloro-formate. In all cases, the starting products are expensive and the yields obtained are slight, thus having prevented any industrial development of this polyurethane.

The present invention provides a direct synthesis, with excellent yields, of polyurethanes corresponding to the general formula presented above, starting from the para or meta derivatives of hydroxy-nitro aromatic compounds, which are not very expensive and easily accessible. The carbonylation reaction requires the presence of a catalytic system.

Applicants have discovered that catalysts containing a precious metal of Group VIII of the Periodic Table, preferably selected from palladium, platinum, or rhodium, and introduced in the customary form of metallic catalysts, such as a metal, oxide, or halide proved to be particularly active. They can also be associated with a heteroaromatic base such as pyridine.

One can advantageously add a second metal, a transition metal, selected from Group $V_b$, $VI_b$, or VIII of the Period Table, such as molybdenum, vanadium, iron and the like, and introduced in the usual form such as metal or oxide. The precious metal can also be deposited on a support, possibly in association with the second metal, thus favoring their recovery and their recycling.

Examples of precious metal halides which can be used in the reaction are the chlorides, bromides, and iodides of palladium, rhodium, ruthenium, osmium, iridium, and platinum. In the case in which a second transition metal is added, it is preferred to use an oxide such as molybdenum trioxide, ferric oxide, or vanadium trioxide.

As another illustration of catalysts according to the invention, the metals can be deposited on different supports, starting from various mineral or organometallic compounds, according to known impregnation techniques in order to lead, following suitable conventional treatment, to the described catalysts. Among metallic precursors which can then be utilized, we find the acetates, nitrates, halides, or organo-metallic complexes of precious metals and acetates, nitrates, halides, oxalates and others of eventually precut round metal. Among the other possibilities are transition metals, but also mixed salts such as, for instance, ammonium molybdate, or also heteropolymetallic molecular complexes directly associating the precious metal with the second transition metal.

After drying, the impregnated support is raised to at least 300° C. under nitrogen, with the help of a linear temperature programming at a rate of 2° C./min. in order to decompose the precursors into metallic crystallites or active oxides in the reaction studied. The supports which can thus be used are diverse, including, but not limited to, the aluminas, silicas, and silica-aluminas, magnesia, activated charcoals, silicon carbides, and the like. Impregnation can be carried out in such a way as to lead to precious metal content values on the support of 0.1 to 20% by weight and preferably between 1 and 15 (% by weight).

The process according to the invention is applicable to molecules of hydroxy-nitro-aromatic compounds of the general formula:

in which Ar is an aromatic radical representing:

with the nitro and hydroxy functional groups being in the para or meta positions with respect to one another. The substituent R can be hydrogen atoms, halogen atoms, or an alkyl radical containing 1 to 10 carbon atoms.

The preferred nitrated compounds are para- and meta-nitrophenol. The concentration of the catalyst in the reaction medium, expressed by the ratio of the number of gram-atoms of the precious metal over the number of nitro groups to be converted, can vary between $10^{-4}$ and 1 and, preferably, between $5.10^{-3}$ and $10^{-1}$. The ratio of the number of gram-atoms of the second metal possibly present, in relation to that of the precious metal, can vary between $10^{-2}$ and $10^2$ and, preferably, between 0.1 and 10.

The heteroaromatic base, such as pyridine, dipyridine, quinoline, when it is used, is added to the reaction medium in quantities going from $10^{-3}$ to 30 moles per mole of nitro derivative, and preferably from $10^{-2}$ to 10 moles per mole. This is done for the purpose of improving the activity and selectivity of the catalyst.

Generally, one operates in the presence of a solvent which can be a saturated or aromatic hydrocarbon such as hexane, heptane, n-decane, decahydronaphthalene, benzene, toluene, or xylene, or aromatic halides such as chlorobenzene and dichlorobenzenes. The quantity of solvent is not critical, but generally one works with solutions containing from 5 to 50% by weight of the nitro derivative. The polymers having been formed are insoluble in these solvents, but can either be rendered soluble in dimethylsuloxide or in hexamethyl phosphorus triamide or sublimated. That is the case as explained by J. F. KINSTLE and L. E. SEPULVEDA in J. Polymer Sci., Polymer Letters ed. 15, 467 (1977) regarding poly (oxycarbonyl-1,4-imino phenylene) which thermally decomposes into para-hydroxyphenylisocyanate which is a stable, gaseous monomer, which sublimates and repolymerizes immediately, as soon as it condenses on the cold wall of the sublimator. Because of this, these polymers can be deposited on surfaces, possibly porous, and present a potential interest as coatings.

The reaction, according to this invention, of nitrated hydroxy aromatic derivatives with carbon monoxide can likewise take place in the presence of a monofunctional alcohol. This alcohol can be aliphatic or aromatic, with the most usual alcohols being methanol, ethanol, and phenol. According to the quantity of alcohol used, more or lesser amounts of carbamate functional groups are created by rupture in the formation of polyurethane chaining. With an excess of alcohol, polyurethane no longer can be isolated; but, instead, the corresponding monomer in the form of a carbamate of the formula:

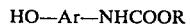

with Ar being the aromatic radical such as previously defined.

The carbamates can be decomposed by heating them to between 150° and 250° C. and the elimination of the liberated alcohol possibly favored by operating under reduced pressure and by using a catalyst such as zinc chloride or ferric chloride, makes it possible to recover the polyurethane polymer.

In the same manner, the presence of a primary or secondary amine or water creates urea functional groups.

The reaction temperatures are between 100° and 500° C., and more particularly between 150° and 250° C.

The pressures are between 20 and 500 bars; preferably between 100 and 350 bars.

The trials described in the following examples have been carried out in a discontinuous manner in an autoclave made of Hastelloy C of 500-ml capacity and equipped with a magnetic agitation device. The autoclave, charged with the hydroxy-nitroaromatic derivative, the solvent, the catalyst, and the heteroaromatic base, is then swept with nitrogen prior to being placed under pressure of carbon monoxide at ordinary temperature. It is then heated to the selected temperature and the progress of the reaction is controlled by pressure recording.

The analyses were carried out by nuclear magnetic resonance (NMR) and by gel permeation chromatography (GPC) by utilizing a column of SHODEX A 802, which permits having an accurate picture of the distribution of the products and of the mass distribution of the polymers being formed. Elemental micro-analyses were performed on the purified products.

The invention will be further described in connection with the following examples which are set forth for purposes of further illustration only, and not by way of limitation of the invention.

EXAMPLE 1

Placed into the autoclave described above are 10 g of para-nitrophenol (0.0719 moles) and 13.5 g of phenol (0.144 moles) corresponding to a molar ratio of phenol/nitro derivative of 2. There is added 0.42 g of palladium chloride, 0.35 g of molybdenum trioxide, 0.35 g of pyridine, and the total volume completed to 100 ml with ortho-dichlorobenzene. The reactor is flushed with nitrogen and then carbon monoxide compressed to 200 bars is then added. The autoclave is insulated and heated, under agitation, to 200° C. during 35 minutes and then cooling takes place. The crude reaction product is gathered, the reactor rinsed with acetone, and everything filtered. There is recovered 6.7 g of a grey precipitate and a filtrate which, concentrated to dryness, yields 7.3 g of residue.

The precipitate is soluble in dimethyl-sulfoxide and in NMR (nuclear magnetic resonance) of the proton presents an aromatic system of AA'BB' characteristic of a paradisubstitution. The spectrum by gel permeation chromatography reveals a single large peak characteristic of a polymer structure centered on a mass of about 1250 and attaining masses above 3500. Micro-analysis carried out on a sublimated sample of this precipitate is characteristic of the polyurethane polymer:

calculated: C=62.22%; H=3.70%; N=10.37%.
found: C=62.15%; H=3.86%; N=10.30%.

The residue of the filtrate, analyzed by gel permeation chromatography and mass spectrometry, shows that we are dealing with a mixture of different polymers and of phenyl carbamate.

EXAMPLE 2

10 g of para-nitrophenol (0.0719 moles) and 6.6 g of ethanol (0.143 moles) are introduced into the autoclave. The molar ratio of ethanol/para-nitrophenol amounts to 2. The catalyst system composed of 0.42 g of palladium chloride, 0.35 g of molybdenum trioxide, to which 0.35 g of pyridine have been added, is added to the autoclave. The total volume is completed to 100 ml with ortho-dichlorobenzene, and by operating as in Example 1, there is introduced carbon monoxide at 200 bars and heated to 200° C. during 10 minutes. Cooling is allowed to take place and the reaction mixture is recovered by rinsing the reactor with acetone. After filtration and washing with acetone, the filtrate is evaporated to dryness and 13 g of a solid grey residue are collected having a melting point of 114° C., whose parent peak in mass spectrometry is at m/e=181. Structural analysis by nuclear magnetic resonance of the proton is CD Cl₃ at 60 MHz leads to ethyl para-hydroxy carbamate thus obtained with a yield of 100%:

δ $CH_3$=1.15 ppm; δ $CH_2$=4.07 ppm; paradistributed aromatic structure leading to a system of the type AA'BB' centered at 6.8 and 7.2 ppm.

After recrystallization of the hot water, one recovers white flakes on which the micro-analysis is carried out:

theoretical: C=59.67%; H=6.08%; N=7.73%,
found: C=59.63%; H=6.01%; N=7.44.

A thermal treatment at 220° C. makes it possible to decompose the carbamate and to recover the polyurethane polymer of analogous structure to the one obtained in Example 1.

EXAMPLE 3

The autoclave is loaded with 10 g of para-nitrophenol, 0.42 g of palladium chloride, 0.35 g of molybdenum trioxide, 0.35 g of pyridine, and 100 ml of ortho-dichlorobenzene. By operating as in Example 1, there is introduced carbon monoxide at 200 bars into the reactor and then heats to 200° C. during 1 hour prior to cooling. The crude reaction mixture is recovered, rinsed with acetone, and the entire mixture filtered. There is collected 8.5 g of dark grey insoluble precipitate and a filtrate which, concentrated to dryness, yields 2.3 g of brown product. The precipitate is rendered soluble in dimethylsulfoxide, filtered and analyzed by NMR and gel permeation chromatography. The results show a polymer of the polyurethane type, identical to the precipitate obtained in Example 1, the microanalysis being in agreement with this structure.

EXAMPLE 4

Into the reactor there is introduced 10 g of paranitrophenol, 0.42 g of palladium chloride, 0.35 g of pyridine, and 100 ml of ortho-dichlorobenzene. The reaction is carried out as previously, at 200° C., after having introduced carbon monoxide at 200 bars at 20° C. After 3 hours reaction time, cooling is allowed to take place. The crude reaction mixture is collected, the autoclave rinsed with acetone, and then the entire mixture filtered. There is thus recovered 7.6 g of insoluble precipitate presenting itself in the form of a grey powder. The filtrate, after concentration to dryness, leads to 3.1 g of a dark product with a slightly pasty appearance. The precipitate is identified by gel permeation chromatography as being a polymer of the polyurethane type of the same nature as those described in Examples 1 and 3.

EXAMPLE 5

Into a balloon flask for solids, mounted on a rotating evaporator, there are placed 10 g of a pure alumina support commercialized by CONDEA CHEMIE, having a specific surface of 250 m²/g and being screened between 200 and 600 ppm. The support is continuously sprinkled with 70 ml of an aqueous solution of 0.920 g of ammonium molybdate and 1.05 g of palladium acetate, while heating the flask to 120° C. under reduced pressure of 20 mm of mercury, in such a way that the water distills in proportion to the impregnation. The introduction lasts for 2 hours and then one bakes the impregnated support at 300° C., under a nitrogen current stream, by using a linear temperature programming of 2° C. per minute. After 16 hours of rising in stages to 300° C., there is introduced a stream of hydrogen for half an hour and cooling permitted to take place while sweeping with nitrogen. According to analysis, the catalyst obtained contains 4.7% of palladium and 4.2% of molybdenum.

Into the autoclave there is introduced 10 g of para-nitrophenol (0.0719 moles) and 0.825 g of ethanol (0.018 moles), which corresponds to a molar ration of ethanol/nitro-derivative of 0.25.

There is added 1 g of pyridine, 1.63 g of mixed Pd-Mo catalyst prepared above, and the total volume brought to 100 ml with the help of ortho-dichlorobenzene. Operation takes place as previously at 200° C. under carbon monoxide at 200 bars at 20° C. The reaction mixture is recovered and the reactor rinsed with acetone, and then the entire mixture is filtered. 4.1 g of a black precipitate are recovered, which concentration to dryness, the filtrate yields 8.3 g of a black solid, whose analysis by gel permeation chromatography shows that it is essentially ethyl para-hydroxy carbamate.

EXAMPLE 6

Into the autoclave there is introduced 10 g of metanitrophenol (0.0719 moles), 0.42 g of palladium chloride, 0.35 g of molybdenum trioxide, 0.35 g of pyridine and the total volume is brought to 100 ml with the help of orthodichlorobenzene. By operating as in Example 1, there is introduced carbon monoxide at 200 bars, the reaction mixture heated to 200° C. for 30 minutes and then cooling takes place. The crude reaction mixture is collected, the reactor is rinsed with acetone, and the entire mixture is filtered. The filtrate, concentrated to dryness, yields 8.2 g of dark grey residue, whose analysis by gel permeation chromatography reveals a polymer structure attaining masses of above 4000. This precipitate can be sublimated, leading to an oily, pale yellow product, which then solidifies and whose elemental analysis corresponds to the polyurethane structure.

EXAMPLE 7

Into the reactor there is introduced 10 g of para-nitrophenol, 0.42 g of palladium chloride, 0.35 g of molybdenum trioxide, 0.35 g of pyridine and the total volume is brought to 100 ml with ortho-dichlorobenzene. By operating as in Example 1, there is introduced carbon monoxide at 180 bars and the mixture heated to 170° C. during 3 hours, and then cooled. After recovery of the reaction mixture, washing with acetone and then filtration, 8.2 g of insoluble precipitate are recovered, which has the structure of the polyurethane polymer.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for the manufacture of polyurethanes by direct reaction in the liquid phase, comprising reacting carbon monoxide with a nitrated hydroxy-aromatic compound of the general formula:

HO—Ar—NO$_2$ wherein Ar represents the aromatic radical:

with the nitro and hydroxyl functional groups being in the para or meta positions with respect to each other and R represents hydrogen or halogen atoms or an alkyl group containing from 1 to 10 carbon atoms, said reaction being carried out in the presence of a catalyst comprising a precious metal of Group VIII of the Periodic Table at a temperature and for a time sufficient to form the polyurethane.

2. The process according to claim 1 wherein the catalyst also includes a transition metal selected from the transition metals of Group V$_b$, VI$_b$, or VIII of the Periodic Table.

3. The process according to claim 1 or 2 wherein the reaction takes place in the presence of a heteroaromatic base or a mono-functional alcohol.

4. The process according to claim 1 or 3 wherein the reaction takes place under a pressure of about 20 to 500 bars.

5. The process according to claim 1 or 3 wherein the reaction takes place in the liquid phase, at a temperature between about 100° and 500° C.

6. The process according to claim 1 or 3 wherein the nitrated hydroxy-aromatic compound is selected from para-nitrophenol or meta-nitrophenol.

7. The process of claim 1 or 6 wherein the nitrated aromatic compound is para-nitrophenol, the heteroaromatic base is pyridine, and the catalyst is selected from palladium chloride, palladium chloride/molybdenum trioxide, or palladium and molybdenum on an alumina support.

8. The process of claim 1 or 7 wherein the reaction takes place in the presence of a solvent selected from a chlorobenzene or a dichlorobenzene.

9. The process according to claim 1 or 8 wherein the reaction takes place in the presence of a mono-functional alcohol to synthesize a carbamate which is then thermally decomposed to give the polyurethane structure.

UNITED STATES PATENT AND TRADEMARK OFFICE
CERTIFICATE OF CORRECTION

PATENT NO. : 4,426,515
DATED : January 17, 1984
INVENTOR(S) : Jacques Kervennal et al.

It is certified that error appears in the above-identified patent and that said Letters Patent are hereby corrected as shown below:

Col. 1, line 16, "cells" should be --calls--;

Col. 3, line 11, delete "transition metals, but also";

Col. 8, line 23, delete "or a mono-functional alcohol".

Signed and Sealed this

Sixteenth Day of October 1984

[SEAL]

*Attest:*

*Attesting Officer*

GERALD J. MOSSINGHOFF

*Commissioner of Patents and Trademarks*